Figure 1:
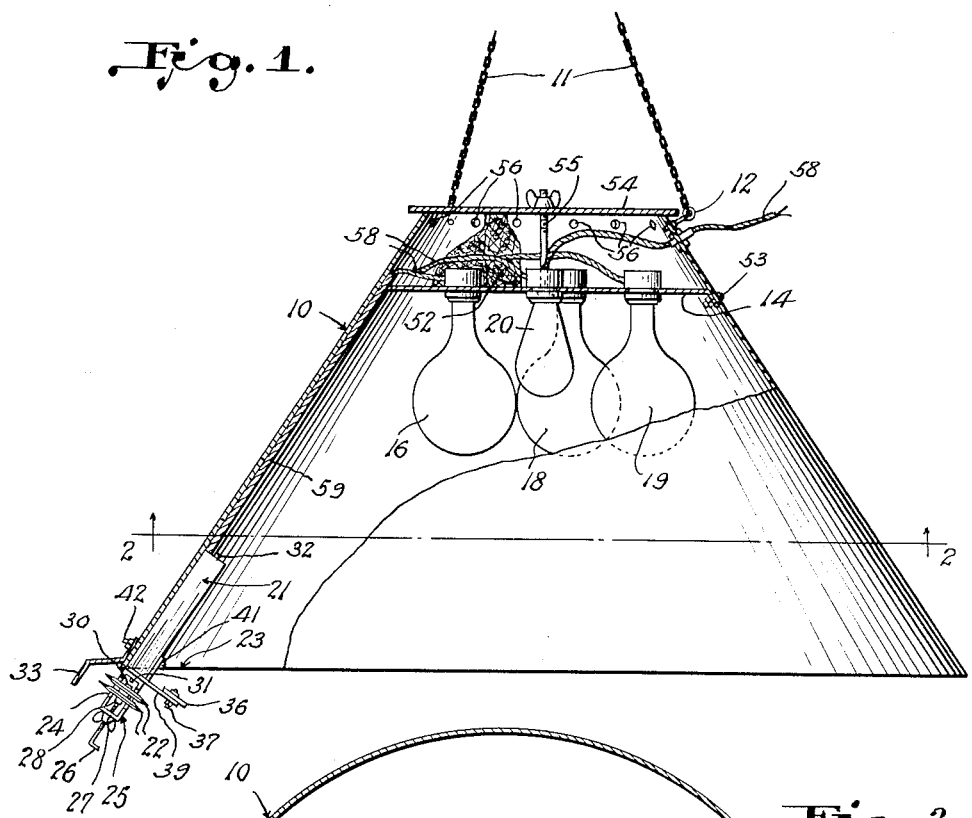

May 15, 1956 W. R. STROH 2,745,940
TEMPERATURE CONTROL FOR BROODER
Filed May 25, 1953 2 Sheets-Sheet 1

INVENTOR.
William R. Stroh
BY Henry H. Snelling
ATTORNEY.

May 15, 1956
W. R. STROH
2,745,940
TEMPERATURE CONTROL FOR BROODER
Filed May 25, 1953
2 Sheets-Sheet 2
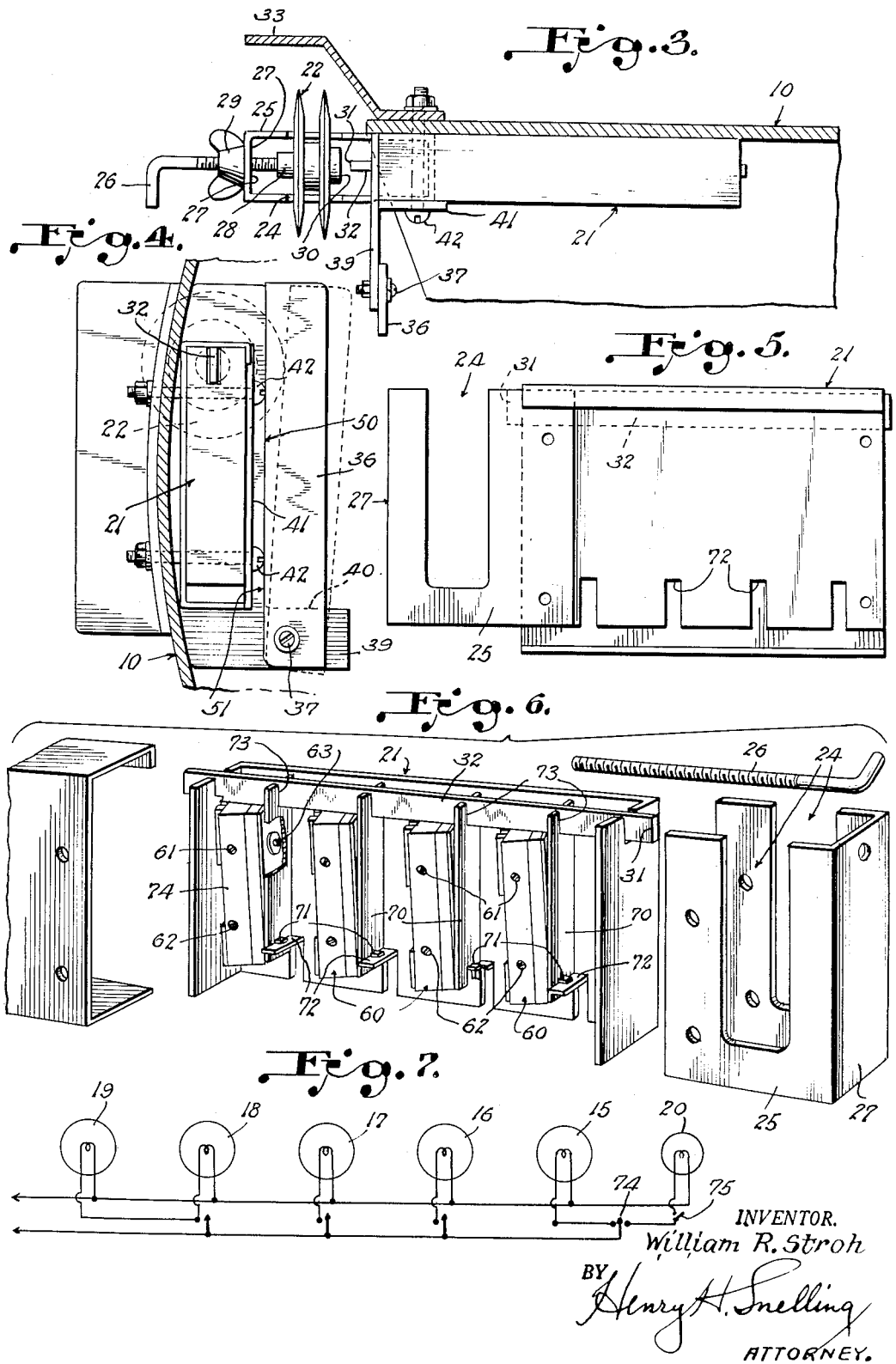
INVENTOR.
William R. Stroh
BY
Henry H. Snelling
ATTORNEY.

United States Patent Office 2,745,940
Patented May 15, 1956

2,745,940

TEMPERATURE CONTROL FOR BROODER

William R. Stroh, Mount Airy, Md.

Application May 25, 1953, Serial No. 356,994

11 Claims. (Cl. 219—35)

This invention relates to temperature control and has for its principal object a method of increasing or decreasing the temperature of a substance in a given space by means of the radiation from a series of heat lamps rather than from the temperature of the air in or near such space; specifically, to control the temperature between a brooder hover and the floor area beneath it in such a fashion that the space on the floor is so evenly warmed that the baby chicks will spread out away from each other because of the uniform temperature and will thus avoid the crowding common to brooders and which often results in the smothering of some of the chicks. This control tends greatly to increase the formation of complete and full sets of feathers on all of the chicks.

A further object of the invention is to secure an increased capacity per watt of power consumed, or, what is the same thing, to reduce the cost of electricity per chick for the same brooding space, this amounting to about 40% over the most modern methods of heat lamp brooding.

A still further object of the invention is to provide a simple mechanism which can be operated by the usual expansion bellows or ether wafers without taxing the ability of the control element or running a risk of rupturing the ether wafer. The mechanism is designed to light up or shut off one or more of a series of infra-red heat lamps in accordance with a chosen proportion of the radiation from the series of heat lamps, the control unit, preferably ether filled wafers, being adjustably shielded for this purpose and also to avoid operation by currents of cold or heated air.

An important object of the invention is the provision of a group of sources of radiant heat preferably of different intensities within a reflecting surface and put into operation in accordance with movement of a control element which is subject to a selected portion of heat reflected from the sources.

Other objects of the invention are called for in the claims and include combinations for providing illumination when all of the heat lamps are extinguished, the use of lamps mounted on a base and with the inverted pyramid or conical hover member acting as a reflector, to be used selectively so as to produce a chosen amount of heat energy varying from a small amount to perhaps 20 times as much whenever that might be required.

Baby chicks are quite sensitive to slight temperature changes. For this reason the present invention contemplates using the expansion bellows or ether wafers close to their points of maximum efficiency, and avoiding pressures that might cause rupture. In actual practice a 24-hour temperature range within as little as one-half a degree of a previously chosen figure can readily be maintained and this with a minimum of attention on the part of the attendant, and irrespective of wide fluctuations of the weather outside of the brooder house. The various parts of the hover illustrated are all readily obtained at low cost; the combination is simple, efficient, highly compact, easily adjusted, and requires no care after being locked in adjusted position.

Figure 2:
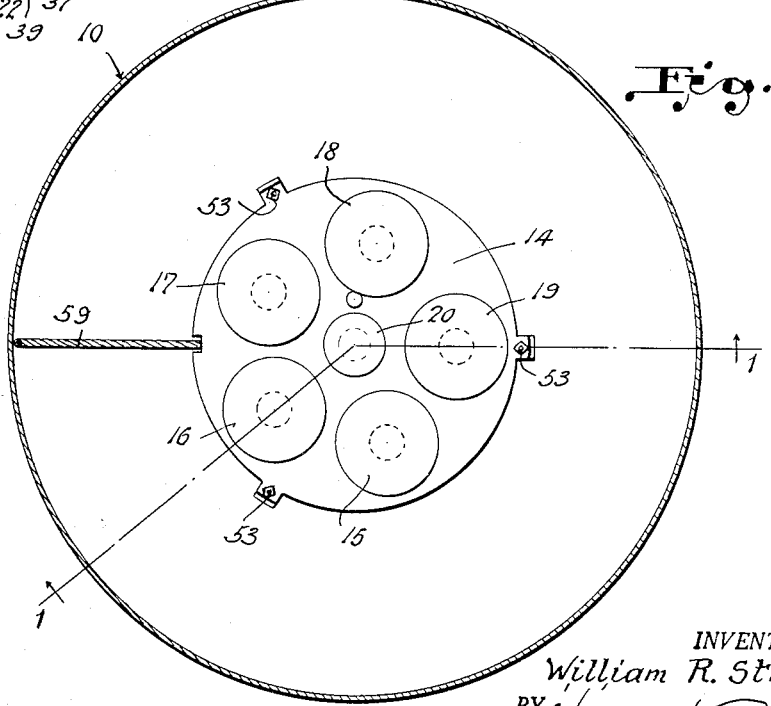

In the drawings:

Figure 1 is a side elevation partly broken away.
Figure 2 is a plan.
Figure 3 is an edge view of the control mechanism on a larger scale.
Figure 4 is a view at right angles thereto.
Figure 5 is a rear view of the switch.
Figure 6 is an exploded view of the switch box.
Figure 7 is a wiring diagram.

The hover 10 may be a pyramid of three, four or more sides but is preferably frusto-conical and may be suspended from the ceiling or otherwise by hangers which are adjustable in length as, for example, the three chains 11, any link of which may be caught in the suspension chain hook 12 so that the hover is at the proper distance above the floor, 18″ from the floor being rather a standard starting point. The hover ceiling or base 14 is located slightly below the hooks 12 and carries a series of infra-red, oven type lamp bulbs of selected power, here shown as 15, 16, 17, 18 and 19 of 125, 250, 500, 250 and 500 watts respectively, although other combinations and wattages can be used, also a sixth bulb 20 of the usual household type, for illumination in the rare cases when the five heat lamps all are out as, for example, in very mild weather.

The electric current to the lamps is controlled by a series of switch members in a casing 21 secured to the bottom or inside surface of the hover 10, preferably at or proximate the edge 23 of the cone or pyramid. A control element, here shown as an expansible bellows or ether filled wafers 22, is positioned in slots 24 of a channel shaped bracket 25 (see Figure 4) carried by the casing 21 and anchored in place by an adjustable screw 26, threaded in the base 27 of the bracket and also in the boss 28 of the bellows. When the screw 26 carrying the bellows is adjusted, it may be locked in such position by the thumb nut 29. It should be noted that the bellows 22 is not controlled by the temperature of the air but is controlled by the amount of radiation it receives, hence the bellows is not a thermostat in the usual meaning of the term but is rather a radiation control element.

The inner end or button 30 of the wafer 22 when expanded presses against the end 31 of the switch control rod or plunger 32, the latter being constantly urged towards the inner button 30 of the control element 22 as will be described later.

To protect the control element 22 from a possible draft in case a door or window of the building or brooderhouse in which the hover is located should be opened, a wind baffle 33 is mounted on the hover 10. On the under side of the hover cone a shield is interposed to reduce direct radiation from the heat lamps, exposing only a slight portion, if any, of the surface of the wafers 22 when the shield is closed to its greatest extent. The amount of exposure is controlled by shifting the movable plate 36 about its pivot 37 on the stationary shield 39, which is cut away as at 40 to receive the casing 21 and having a right-angularly bent bracket 41 which engages the bottom surface of the casing 21 and is secured to it by the same bolt 42 as is used to secure the draft shield 33 on the opposite or top side of the hover 10.

By loosening the lock washer 38 and moving the adjustable shield 36 about its pivotal screw 37, a slight crack is formed between the edge 50 of the adjustable shield 36 and the edge 51 of the stationary shield 39 and this crack may be greatly enlarged by moving the adjustable shield 36 still further downwardly about its pivot. Not only does the shield control the amount of radiation that may pass to the wafers but it also protects the control element 22 from the hot air currents that move from the base 14 to the periphery 23 of the cone, that is, slantingly downwards.

Referring again to Figure 1: the canopy of the hover 10 is of aluminum which not only provides lightness but furnishes the reflecting skirt surface desired. Sheet aluminum comes in a number of different qualities and some of these have extreme reflecting abilities. This is desirable and I find its use highly advantageous. Above the base 14 which is secured to the conical hover as by the bolts 53, I mount a top 54 conveniently held in place by the bolt 55 so that it can be readily removed. As indicated in Figure 1, the diameter of the top 54 is appreciably greater than the diameter of the top of the cone and thus provides projecting eaves to keep dust from entering the ventilating holes 56. I often find it convenient to fill the space between the top 54 and the base 14 with insulating material 52 and when this is used the top 54 is not uncomfortably hot to pressure of one's hand even with all of the lamps burning.

An electric cord 58 leads to the various lamps as controlled by the switches in casing 21, the necessary wires being conveniently led thru a conduit 59 on the bottom surface of the cone. In the casing 21 I mount a number of micro switch elements 60, these being well known and illustrated in Patent No. 1,960,020. As shown in Figure 6 the micro switches are secured to the casing 21 by a plurality of bolts 61 and 62, the latter being slightly smaller than the hole in the micro switch, this allowing the switch to be moved about the bolt 62 as a pivot for extreme accuracy in adjusting the position of the engaging end of the pin 63. A plurality of light gage aluminum leaf springs 70 each rock on an integral right-angularly bent lug 71 resting on a bracket 72 struck out from the metal of the case 21. The free end of the spring 70 is engaged in a slot 73 in the switch actuating plunger 32.

When the plunger 32 is pushed to the left in Figure 6 by expansion of the control element bellows, the several micro switches 60 are engaged consecutively and as each pin 63 is engaged in sequence the lamps governed by the several switches are extinguished and when the plunger 32 is at its extreme travel, the last switch 74 connects the so-called night light 20 so that this burns when all the other lights are out and gives the desired amount of illumination (see Figure 7). As the plunger 32 moves to the right, the switches are disengaged in order from left to right. I find it convenient to have a manual switch 75 to control the night light as this lamp is not used in the daytime.

As will readily be understood, the distance between the normal position of a spring 70 and its switch actuating pin 73 is constantly increased from right to left so that the several normally closed switches will be operated one after the other as the ether wafers 22 contact and the plunger 32 moves to the right. The total power of the five heat lamps is shown as 1625 watts, the lamps being connected to the four switches so as to give the total power of the lamps when the bellows is contracted. The two lamps 18 and 19 are coupled together on the final circuit, lamp 15 is on the first circuit, lamp 16 on the second circuit, and lamp 17 on the third circuit; consequently when the night light 20 is burning all of the heat lamps are out and as the control element calls for more heat, lamp 15 first burns giving 125 watts and the night lamp goes out. If still more heat is required, the next switch actuating pin 63 is engaged and this causes lamp 16 of 250 watts to burn so that the total heat now given is that of the two lamps 15 and 16. In like manner a further requirement for heat engages the switch actuating pin 63 of the lamp 17 and the total wattage is now increased to 875 watts. Still further need for heat engages the pin 63 of the final circuit micro switch 60 and this adds 750 watts more current, the last two lamps 18 and 19 going on and off together.

In former devices of this kind the pressure required to throw a series of four switches has been about five pounds and this has been found to be much too close to the limit of capacity of usual thermal switch bellows insofar as retaining a linear expansion curve is concerned. In the present device the total pressure exerted on the switch actuating plunger does not exceed two pounds, as the leaf springs are not only of light gage aluminum but they are also delicately mounted and are merely required to touch the pins of the micro switches.

The amount of radiation which is permitted to strike the expansion bellows 22 is governed by the position of the shield 36 giving an opening of any desired amount. Whenever the radiation from such lamps as may be burning more than meets requirement, it being immaterial whether or not chicks are present below the hover, the wafers 22 expand and the next switch is released thus causing the lamp or lamps controlled by it to go out while all others to the right in Figure 7 remain in operation.

An important feature of the present invention is the control of the radiation pattern on the floor beneath the hover. Where lamps are used which have reflectors of their own, an undesired radiation pattern is secured as there is always a hot spot in the center of each pattern which is much too hot for use with poultry, provided the edge of the pattern is maintained at a comfortable level. As a typical example: a single bulb with a usual reflector when aiming vertically downward 18" from the floor presents a circle a yard in diameter. But when the edge of this pattern is at the chosen figure which we will assume at 80° F., the center hot spot may run double that. This heats the air it is true but it does not give a temperature suitable for young chicks.

In the present unit the ceiling of the hover is a plane surface and while this could readily be domed to give a more even pattern, it is found that the plane surface, by providing a slightly increased circular radiation pattern, actually accomplishes a much desired purpose because at 20" from the floor, for example, the temperature rise in the central smaller circle over that of the much larger circle is only about 10° F. in still air and while this could easily be eliminated as suggested by curving the base 14, I find it desirable because there are frequently a number of weak chicks that require more heat than the others and this central elevated temperature pattern is therefore advisable and it is for this reason I prefer that the base 14 shall be flat.

An important feature which should not be overlooked is that the brooding space is far larger in diameter than the bottom of the hover even when the latter is at its closest working point to the floor, thus giving great advantages over the ordinary electric brooder, where the only space that is heated is the space directly beneath the hover and of the same diameter. The present unit working as it does on the radiation principle, further makes it possible to increase the brooding area as the chicks grow older and require greater space by the simple expedient of raising the heat reflecting hover further from the floor.

The shield opening, either a single opening as illustrated, or a plurality of circular openings in the stationary shield and cooperating holes in the adjustable shield so that all openings can be simultaneously opened or closed, the amount of radiation used to control the bellows can be adjusted to equal the amount needed to replace the heat loss from the chicks independent of the temperature of the air. Consequently, it is not the air temperature which operates the bellows under normal conditions but rather is the radiation. As the chicks increase in age, the starting point of operation is altered by moving the adjusting screw to the desired point.

In the use of this device in a large brooder house which contained one new unit as described herein, one early experimental-use hover following some but not all of the present arrangements, and a third brooder of the best type previously obtainable, an interesting thing was observed, the chicks selected the unit as described herein rather than either of the other types. This particular house contained 1500 chicks and 1200 of them selected the present unit, somewhat over 200 brooded under the first experimental unit, and the very small balance brooded under the older unit. Just why this is so has not yet been determined. It might be due to the evenness of the floor pattern and the fact that the brooding area, much larger than the bottom of the cone, is constant whether only one bulb is burning or whether all are burning. Neither have I been able to determine why the feather growth is so much improved with the present hover.

What I claim is:

1. In combination, a reflector, a plurality of sources of infra-red light mounted proximate the reflector, a switch for controlling current serially to said sources, an expansion bellows mounted in the path of radiation of said infra-red lights, means controlled by the bellows for operating the switch, means for adjusting the expansion of the bellows, and a shield for restricting the passage of a major portion of the radiation from the light sources to the bellows, said shield being independent of the bellows and the expansion control means of the bellows.

2. The combination of claim 1 in which the shield is adjustable and is located to shield the bellows from warm air moving along the surface of the reflector, whereby the bellows responds solely to the radiation received and is independent of the temperature of the ambient air.

3. In a brooder, a canopy having an upper base and an aluminum open bottom skirt having a highly polished inside surface increasing in size downwardly, a plurality of spaced heat sources mounted below the base so the heat waves will be reflected by the skirt through the open bottom thereof in a substantially uniform pattern, and a control switch unit for governing the energizing of the various members of the heat sources serially in accordance with radiation from the members of the heat sources which are energized, said unit being located near the open bottom of the skirt.

4. The brooder of claim 3 in which each member's energization is controled by an individual switch, and an adjustable expansion bellows operates the individual switches in sequence as more or less heat is required.

5. In a hover, a frusto-conical skirt of a metal having high heat reflecting property and having an open lower end, a horizontal reflecting base closing the top of the skirt, at least three oven type infra-red lamps of different intensities mounted on the base and inside of the skirt, a series of adjustable switches each controlling at least one of the lamps, and a single control means for successively operating the switches as the need for heat under the hover increases or decreases, all of the switches urging the control means to position to deenergize the lamps, said horizontal base insuring a slightly higher temperature axially than at the margin of the open end of the skirt, whereby to provide a central space for weak chicks requiring more heat than supplied at the uniform comfortable level at the margin of the heating space.

6. In combination, a hover canopy comprising a heat reflecting skirt increasing in inclosed area downwardly, a horizontal intermediate base of heat reflecting material forming a ceiling for the canopy, a removable canopy top at the top of the skirt of greater area than the top of the skirt to overhang the skirt and minimize entry of dust to the space between the top and the base; means for adjustably mounting the canopy a chosen distance above a floor, a series of heat bulbs mounted in the canopy below the base in position for the heat rays to be reflected to the floor by the base and by the skirt, and means for energizing the bulbs serially as the heat reflected to the floor decreases from a chosen amount.

7. In combination, a highly polished aluminum reflector, a plurality of spaced sources of infra-red rays mounted proximate the reflector, a switch for serially controlling current individually to said sources, an expansion bellows in the path of the light rays from said sources, means for adjusting the expansion of the bellows, means controlled by the expansion bellows for operating the switch, an adjustable shield interposed between the source and the bellows to restrict the passage of a major portion of the rays to the bellows, and means for adjusting the pressure on the bellows at full expansion to an amount below two pounds, whereby the bellows may operate at its maximum efficiency.

8. In a poultry brooder hover, a base, a reflecting skirt depending from the base, a series of infra-red heat lamps mounted on the base, an expansible bellows mounted at the lower edge of the skirt to lie in part in the path of the heat rays from the lamps, a switch plunger resiliently pressed against the bellows, and a series of switches, each connected to one of the lamps, for serial operation by the plunger as the bellows expands.

9. A poultry brooder hover canopy, for suspension at various distances above a brooder floor, comprising a hover ceiling or base, a plurality of spaced sources of infra-red light mounted in the base, a reflector secured to the base, surrounding the light sources and having a constantly increasing cross-sectional periphery from the base downward to an unrestricted lower margin lying in a plane parallel to the brooder floor, a radiation-responsive device in the path of radiation of the light from the light sources and the reflector, a switch governed by said device for controlling energization of the several light sources serially as the device moves with radiation changes, and means proximate the device for shielding the device from temperature changes due to air currents inside of and outside of the reflector and from a selected partial amount of radiation from the light sources.

10. The hover canopy of claim 9 in which the reflector is a right circular cone, the base is circular, and the shielding means is adjustable to vary at will the amount of radiation passing to the device.

11. The hover canopy of claim 10 in which the device is an expansion bellows with bellows adjusting means and the adjusting of the shield is independent of the bellows adjusting means.

References Cited in the file of this patent

UNITED STATES PATENTS

| | | |
|---|---|---|
| 1,186,024 | Mulvaney | June 6, 1916 |
| 1,386,569 | Herd | Aug. 2, 1921 |
| 2,076,115 | Benit | Apr. 6, 1937 |
| 2,349,300 | Olsen | May 23, 1944 |
| 2,493,589 | McCaskell | Jan. 3, 1950 |
| 2,556,065 | Callender | June 5, 1951 |
| 2,611,855 | Turner | Sept. 23, 2952 |
| 2,612,594 | Schubert | Sept. 30, 1952 |
| 2,621,423 | Clark | Dec. 16, 1952 |